March 30, 1965    A. R. SIRLES ET AL    3,175,690

PLASTIC ROTARY DRUM FILTER UNIT

Filed July 6, 1961

INVENTORS
ADEN R. SIRLES
THOMAS R. KOMLINE

BY *Watson, Cole, Grindle & Watson*

ATTORNEYS

3,175,690
PLASTIC ROTARY DRUM FILTER UNIT

Aden R. Sirles, Mendham, and Thomas R. Komline, Gladstone, N.J., assignors to Komline-Sanderson Engineering Corporation, Peapack, N.J., a corporation of New Jersey
Filed July 6, 1961, Ser. No. 122,319
2 Claims. (Cl. 210—404)

This invention relates to a drum type fluid filter unit and more particularly to the construction of the filter drum thereof. In making fluid filter drums in the past, it has been customary to form the rotating filter drum of sheet metal or metal plate suitably reinforced to withstand the operating stresses and to afford the required rigidity. Such drums have been of the construction, for instance, such as generally exemplified in the United States Patents of Thomas R. Komline Nos. 2,583,698 and 2,652,927.

It has been found advantageous also to construct such drums of sheet plastic material since the use of such material for fabricating the drum structure affords very definite economy and ease of construction, and the material itself generally offers strong resistance to deterioration by the action of various chemicals, corrosive fluids and the like which may be incorporated in or comprise the liquid to be filtered. Plastic filters as thus formed, however, have for all practical purposes been limited in size due to the fact that the plastic sheet material defining the cylindrical surface thereof tends to sag and become deformed, due to lack of sufficient inherent rigidity, when employed in the larger sized filter drums in the absence of some special internal supporting structure. The expense and difficulty of fabrication of such supporting structure has detracted greatly from the inherent advantages of such a plastic structure.

The foregoing difficulties arising from lack of rigidity of the cylindrical sheet material of the drum have been aggravated by the fact that it has been customary to have the filtrate pipes extending through and at least partially supported by the sheet material defining the cylindrical surface of the drum.

The present invention has been conceived with the foregoing in mind and has as its primary object to make possible the production of plastic filter drums of substantially unlimited size, which at the same time are quite rigid and strong in their construction, while at the same time incorporating the advantages of lighter weight and lower cost of production as contrasted to the usual metal drums of comparable size.

It isa further object to provide such drums in which the cylindrically formed sheet material of the drum is relieved of the task of supporting any part of the weight of the filtrate pipes or passages. It is a still further object to provide such a drum in which the various plastic parts are firmly connected to and supported by the rigid central shaft of the drum.

In carrying out the invention, the drum itself is formed as a sheet plastic cylinder closed at its opposite ends by discs, also of plastic, which are supported from a rigid shaft extending axially through the drum, the drum being completely filled with a substantially rigid plastic foam of a type which adheres to the entire inner surface of the drum and through which the various filtrate passages may extend. The said passages may comprise conduits or pipes embedded in and supported by the plastic foam or, alternatively, may constitute passages formed directly in and through the plastic foam.

A preferred embodiment of the invention is illustrated in the accompanying drawings in which.

Figure 1:
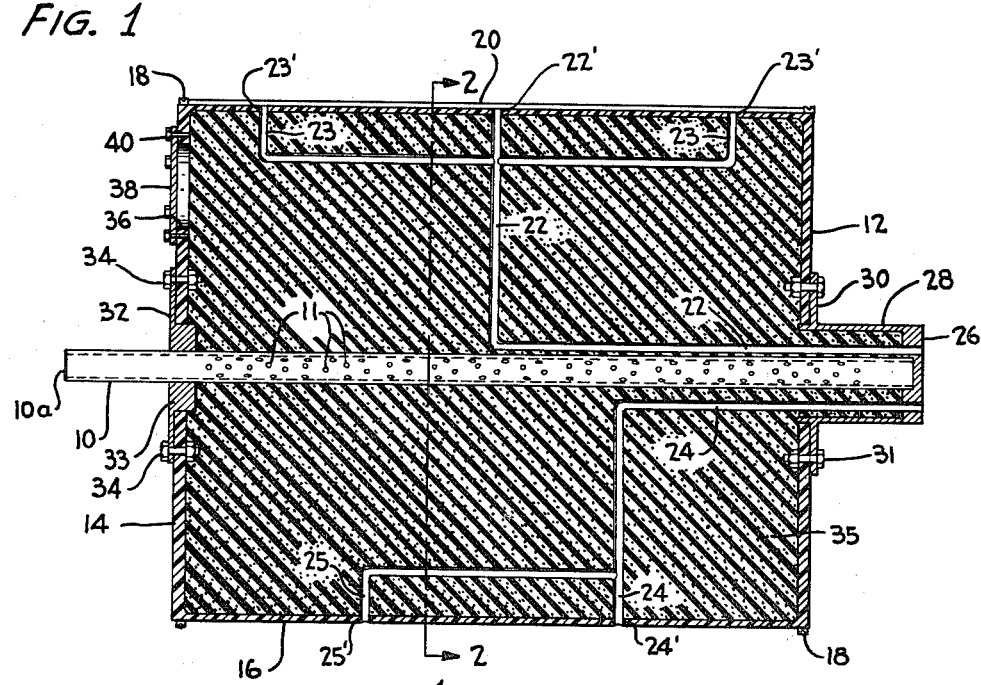
FIGURE 1 is a cross section through a filter drum in accordance with the invention, the same being taken on the line 1—1 of FIGURE 2.
Figure 2:
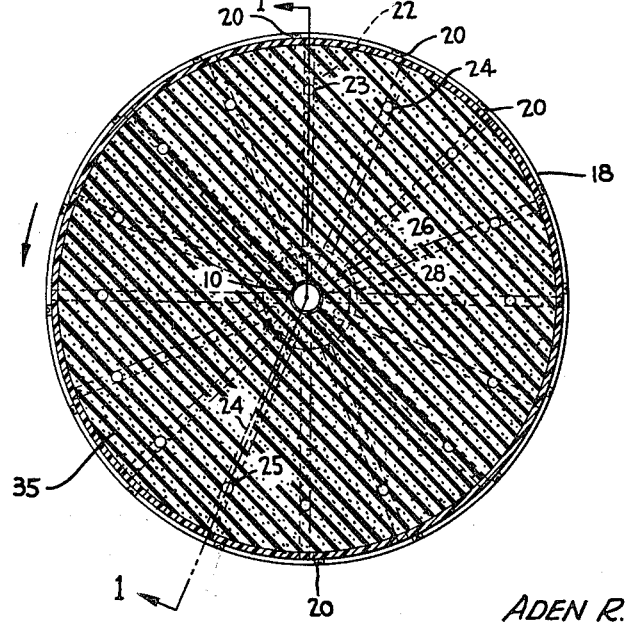
FIGURE 2 is a radial cross section through the filter drum taken on the line 2—2 of FIGURE 1.

Referring now in detail to the drawing, it will be seen that the drum therein shown is supported for rotation by means of a rigid horizontal shaft 10 which, if desired, may be of tubular construction open at one end 10a. Also in some applications it may be desirable to provide the said shaft with a plurality of perforations 11 throughout its entire extent within the interior of the drum for reasons which will appear hereafter. The drum itself is defined by the two relatively axially spaced end discs 12 and 14, both of equal diameter and disposed concentrically about the shaft 10. Extending between and peripherally supported by these discs 12 and 14 respectively is the cylindrical drum wall 16 of plastic sheet material. The drum wall as well as the end discs will preferably comprise a suitable polyester which will preferably be reinforced with fiberglass embedded therein accordance with known practice. The cylindrical drum surface or sheet 16 and its end discs will be secured together in known manner as by cement or solvent welding.

As is usual in such structures, the cylindrical surface of the drum has projecting therefrom the end seals 18—18 and is divided into a plurality of segments by means of relatively uniformly spaced division strips 20 extending parallel to the axis of the drum between the said end seals. It will be understood that a suitable filter media such as filter cloth or a filter belt may be supported in conventional manner around the drum over the end seals 18 and division strips 20 and spaced from the cylindrical surface 16 as by usual perforated grids whereby filtrate may be drawn through the filter media into filtrate passages such as 22, 23, 24 and 25 opening outwardly through the cylindrical sheet 16 and extending through the interior of the drum. Passages 23 and 25 are branches of and communicate respectively with passages 22 and 24 which open axially through the valve plate 26, as indicated in FIGURE 1. In the present embodiment it will be seen that the plate 26 is supported in somewhat axially spaced relation to the adjoining end disc 12 of the drum by means of a sleeve 28 having a radial flange 30 secured to the disc 12 as by means of the bolts 31. It will be seen also that the interior of the sleeve 28 communicates with the interior of the drum itself and the sleeve is fixed relative to the shaft 10 by means of the mutual rigid connection of both the shaft and the sleeve to the plate 26. With this arrangement the outer cylindrical surface of the drum 28 may be rotatably journaled and supported in a trunnion bearing as may be opposite outwardly projecting end portion of the shaft 10 whereby, in accordance with usual practice, the drum structure may be supported for rotation with its lower portion submerged in the liquid to be filtered. The filtrate passages or conduits 22, 24 extend through the annular space between the sleeve 28 and shaft 10, to connect with and open through valve plate 26.

The end of the drum opposite the valve plate 26 preferably is provided with a metal or other rigid adaptor disc 32 concentrically secured on the shaft 10 and having a centering collar 33 received in a central opening in the disc 14. Bolts 35 or any other suitable means may be employed to secure the adaptor disc 32 to the end disc 14.

Thus with the arrangement shown it will be understood that the drum is rotated at a slow rate of speed by any suitable means, as exemplified for instance in either of the above-identified patents. A conventional rotary valve structure including a stationary valve element associated with the rotating valve plate 26 is utilized to control the application of suction through the passages 22–25 to transmit such suction to the various segments of the drum at proper times depending on their respective angular positions and, if desired, also to transmit air under pressure through the respective passages at the time the filter segments associated therewith are positioned opposite the point of discharge of the filter cake.

While the structure as thus far described and its mode of operation are more or less conventional, it has been found possible to provide a plastic filter drum of considerably larger dimensions than would otherwise be possible, by the expedient of disposing within the interior of the drum a rigid plastic foam filler 35 which completely fills the drum interior and also of a character or type which adheres firmly to the inner surface of the drum, thereby affording the necessary structural strength and rigidity required in large sized drums while at the same time permitting the overall drum structure to be of comparatively light weight and easily transportable as contrasted to comparatively sized metal filter drums.

A suitable plastic foam for this purpose may comprise a polyurethane such as a polyether or a polyester material. Suitable polyurethanes for this purpose are disclosed, for instance, in the United States patents to Greenlee, Nos. 2,907,749 and 2,907,750, both granted October 6, 1959. Such plastic foam may be injected into the drum while in liquid form, through an opening 36 having a removable cover plate 38 adapted to be secured in position as by the bolts 40 in FIGURE 1. The polyurethane disclosed by these patents is of a type which will cure at room temperature to attain a rigid form and to adhere to the interior of the drum to form a unitary structure as desired. The passages 22, 23, 24 and 25 may be defined by plastic pipes which may be rather loosely positioned and maintained in place during filling of the drum with the plastic foam, following which the solidifying of the plastic foam incident to its curing will provide a firm and quite rigid support for these pipes and will thus relieve the cylindrical plastic sheet or skin 16 of any stresses which would otherwise be transmitted thereto incident to the weight of the pipes. In lieu of the plastic pipes the passages 22 through 25 may be provided by positioning of removable core pieces within the drum during the pouring and subsequent curing of the plastic foam, following which the core pieces may be removed to leave the passages as shown. The particular shape and disposition of the passages may be varied as desired to adapt them to ready formation in this manner.

It will be apparent that the plastic foam 35 thus not only may serve to provide the passages but also may serve to relieve the plastic skin 16 of the stresses incident to the supporting of the pipes. In addition, the plastic foam itself bonds with the plastic sheet material of the drum, as well as the shaft, to define a rigid unitary and yet light-weight structure. Moreover, the rigidity of the structure is increased by virtue of the centrally disposed rigid shaft 10 and its coaction with the foam filler 35.

Instead of providing a foam which is self-curing at room temperatures as above described, the plastic foam filler 35 may be of the type, and applied in the manner described in the Newberg et al. Patent 2,958,905. Such plastic foam comprises expanded styrene polymers as, for instance, expandable granules or particles such as polystyrene. The drum may be filled with such particles through the opening 36, the particles having been first pre-expanded at least 50% of their ultimate potential as described in the said patent. Thereafter and in accordance with the Newberg et al patent, an exothermus liquid substance may be forced into the drum under pressure through the open end 10a of the hollow shaft 10 to escape into the drum interior through the perforations 11. Such substance then reacts with the granules to complete their expansion and to fuse and cure them by heat. Preferably the exothermus service employed is of the type disclosed in the aforesaid patent which is forced against the interior surfaces of the cylindrical drum and forms a tough surface layer or skin integral with and tightly laminated with both the foamed mass 35 as well as with the inner surface of the plastic drum structure itself.

Although the present application shows and describes but a single embodiment of the invention together with minor modifications thereof, it will be readily apparent that other types of plastic foams and techniques of applying same will undoubtedly be found suitable for use in the invention, and that various of the structural details may be changed in obvious manner, all without departing from the scope of the invention as defined in the appended claims.

The invention having thus been described, what is claimed as new is:

1. A hollow plastic filter drum of cylindrical configuration comprising a rigid shaft extending coaxially through said drum, a pair of relatively spaced end discs of plastic material fixedly supported on said shaft, a cylindrical wall of sheet plastic material supported between said end discs coaxially to the said shaft, a filtrate valve plate fixed at one end of the drum, said drum being filled with a rigid plastic foam adhesively secured to the interior of the drum and to said shaft and rigidly interconnecting the cylindrical drum wall and the rigid shaft, and filtrate passages formed in and extending through said foam from said cylindrical wall to said valve plate and opening through both said wall and said valve plate.

2. A filter drum as defined in claim 1, including conduits embedded in said plastic foam to define said filtrate passages.

References Cited by the Examiner

UNITED STATES PATENTS

| | | | |
|---|---|---|---|
| 616,033 | 12/98 | Sturcke | 210—404 |
| 1,892,306 | 12/32 | Hillier | 210—395 X |
| 2,180,304 | 11/39 | Minor. | |
| 2,409,910 | 10/46 | Stober. | |
| 2,633,993 | 4/53 | Biggar | 210—395 X |
| 2,728,702 | 12/55 | Simon. | |
| 2,753,642 | 7/56 | Sullivan. | |
| 2,826,244 | 3/58 | Hurley. | |
| 2,838,100 | 6/58 | Follows. | |
| 2,958,905 | 11/60 | Newberg. | |
| 3,027,011 | 3/62 | Flynn | 210—404 |

HARRY B. THORNTON, *Primary Examiner.*

HERBERT L. MARTIN, ALEXANDER WYMAN,
*Examiners.*